Oct. 26, 1937. W. JONES 2,096,900
COOLING SYSTEM
Filed July 17, 1935
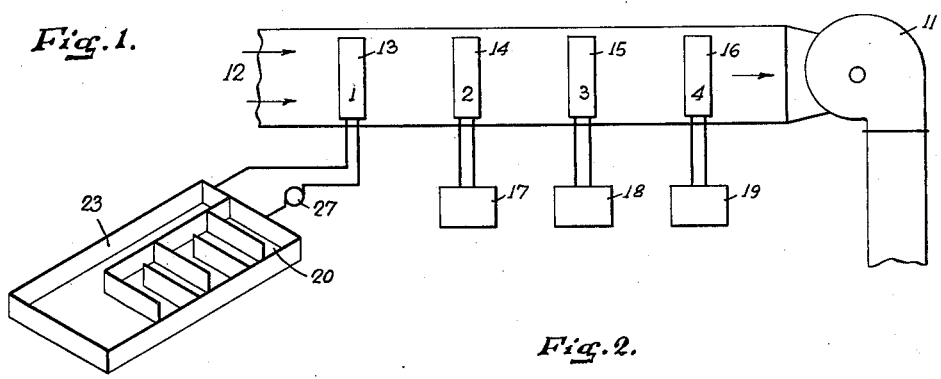
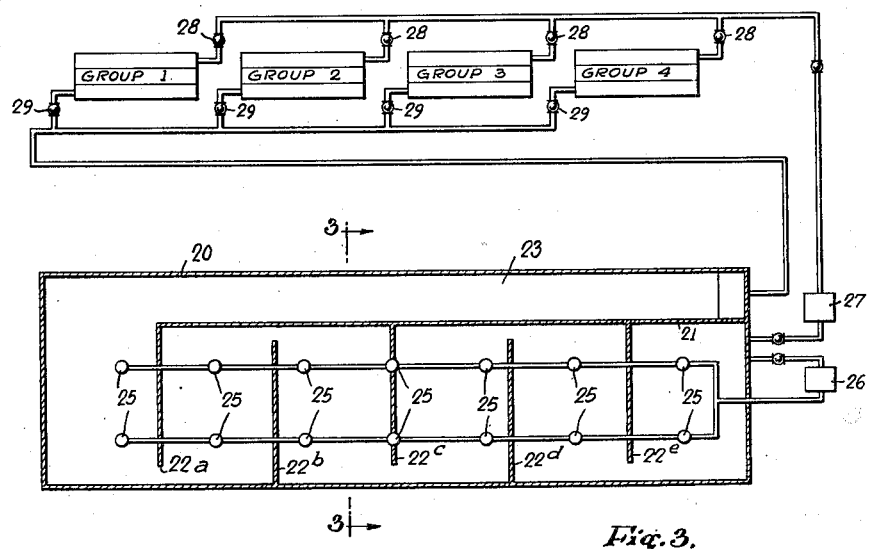
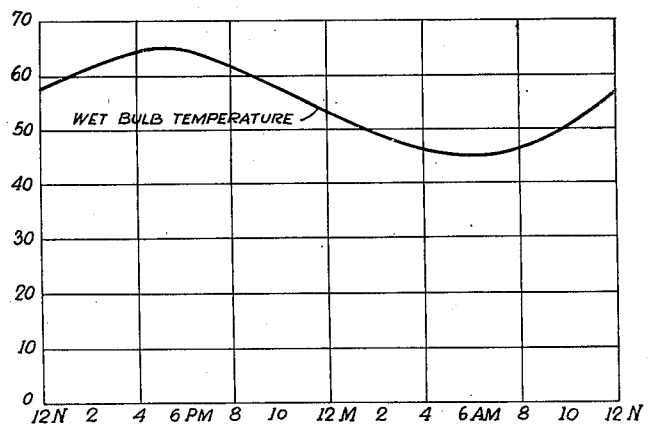
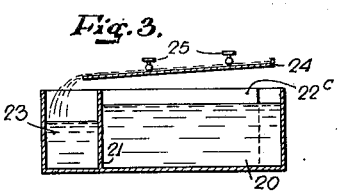
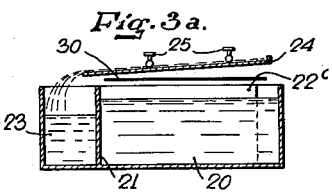
INVENTOR.
Walter Jones
BY Herman Seid
ATTORNEY.

Patented Oct. 26, 1937

2,096,900

UNITED STATES PATENT OFFICE 2,096,900

COOLING SYSTEM

Walter Jones, Princeton, N. J., assignor, by mesne assignments, to Carrier Corporation, Newark, N. J., a corporation of Delaware Application July 17, 1935, Serial No. 31,753
In Great Britain July 19, 1934

12 Claims. (Cl. 62—171)

This invention relates to cooling processes and more particularly to methods for providing refrigeration for such processes.

In general, evaporative cooling of both water and air is well known and has been used for many years. The principle involved is that air brought in contact with a body of water tends to saturate itself with water at the wet bulb temperature of the incoming air and consequently, both the air and the water are practically cooled to this incoming wet bulb temperature. The extent of cooling which may be accomplished is a function of the wet bulb temperature of the air.

In most practical applications, this principle cannot be used to its best advantage because atmospheric conditions are too uncertain. The wet bulb temperature in most places is usually too high to permit the necessary cooling. However, in certain parts of the world, particularly at high altitudes, or where the climate is dry, the moisture content of the atmosphere remains substantially constant. Thus, the larger proportion of the air temperature change is due to changes in sensible heat. That this is true is well illustrated by considering the air temperatures in a desert. During the day, the temperature may be 110 degrees or more—unbearably hot—while, as soon as the sun goes down, the temperature drops rapidly and the air becomes uncomfortably cold. Where such conditions prevail, the dewpoint remains substantially constant throughout the day, and the wet bulb curve, that is, wet bulb temperatures plotted against time over a twenty-four hour period, remains substantially constant from day to day. The invention involves utilizing this condition to cool a volume of water to a desired temperature during the period when the wet bulb temperature is lowest, storing this water and utilizing it for cooling purposes when the wet bulb temperature is high.

The general object of the invention is to use atmospheric cooling to provide refrigeration.

Another object of the invention is to cool water by contact with air during the time when the air temperatures are low, to store the water, and then, to use the water for cooling purposes when the air temperature rises above a desired point.

Another object of the invention is to store refrigerating effect during low heat load periods and to draw on the refrigerating effect so stored to effect cooling during high heat load periods.

A further object of the invention is to provide mechanical refrigeration as a cooling means and to augment this cooling means by the use of atmospheric water cooling, thus to reduce the amount of mechanical refrigeration which must be provided.

A still further object of the invention is to provide a stage cooling system in which mechanical refrigeration is provided for cooling a medium in several steps and to provide an auxiliary cooling step utilizing atmospheric cooling to take care of peak heat loads.

Another object is to provide a cooling system in which water cooled by contact with air at suitable low wet bulb temperatures provides for initial cooling of air, and mechanical refrigeration is used to take care of peak heat load conditions.

A further object is to cool water by contact with air at suitable low wet bulb temperatures, the water subsequently being used to cool air to reduce its wet bulb temperature, the air then being subjected to sprays whereby it is saturated substantially at its reduced wet bulb temperature.

Other objects and features making for economy in first cost and efficiency in operation will be more apparent from the following description and drawing.

A method of providing refrigeration according to the invention comprises cooling a volume of water by contact with air when the wet bulb temperature of the air is below a desired point, storing the cooled water and utilizing the cooled water for refrigerating purposes when the wet bulb temperature of the air rises above a desired point.

From another aspect the invention includes a method of cooling air which comprises cooling a volume of water by its contact with air when the temperature of the air is below a desired wet bulb, storing the water, cooling another volume of water by mechanical refrigeration processes and utilizing the stored water to augment the cooling capacity of said artificially cooled water.

With these objects in view the invention comprises the use of a spray cooling pond or cooling tower to cool water by contact with air and a tank in which this water may be stored until such time as the air temperature rises above a desired point, whereupon the stored water may be utilized as a cooling agent.

The invention also comprises the use of a storage tank, a cover for the tank, a plurality of sprays supplied with water from said tank, discharging into the air, and falling upon the cover, and means for collecting the sprays and discharging them into the storage tank.

A plurality of baffles may be provided in the storage tank whereby the cold water contained therein may be effectively separated from the warm water contained therein and whereby the entire volume of water in the tank may be cooled, and means may be provided for reflecting sunlight from the tank, thus to reduce the amount of heat gain from solar radiation.

An installation operating according to the invention may comprise a plurality of refrigerating machines, a plurality of cooling surfaces, spray devices or other dehumidifying means, one being provided for each machine, and a cooling surface, spray device, or the like, which is supplied with cold water from a storage tank whereby air may be cooled down in successive stages, thus to secure maximum refrigerating capacity from each machine and consequently, minimum operating costs.

Other objects and features of the invention will more clearly appear from the following description to be read in connection with the accompanying drawing, in which:

Fig. 1 is a diagrammatic view of an air cooling system embodying the invention;

Fig. 2 is a diagrammatic plan view of a storage tank for supplying water to a plurality of cooling surfaces;

Fig. 3 is a sectional elevation on the line III—III of Fig. 2, illustrating diagrammatically the storage tank shown in Fig. 2; and Fig. 3a shows in similar elevation a modified construction; and Fig. 4 is a typical diagram showing the variation in wet bulb over a twenty-four hour period.

In the drawing like reference numerals designate the same or similar parts.

First considering Fig. 1, numeral 10 indicates generally a conduit through which air is drawn under the influence of fan 11 in the direction indicated by the arrows 12. Mounted in the conduit are a plurality of heat exchange units or conditioning means, 13, 14, 15 and 16. While the units are diagrammatically shown, they may be either of the spray type or of the surface cooler type. Heat exchanger 14 is provided with a refrigerating machine 17, heat exchanger 15 with a refrigerating machine 18, and heat exchanger 16 with a refrigerating machine 19. Thus, assuming that the conditioned air is to have a dewpoint at or below 33 degrees, and that the incoming air has a wet bulb temperature of 60 degrees, refrigerating machine 17 supplies water to heat exchanger 14 at a temperature of 43 degrees, and the air passing thereover is cooled to a dewpoint temperature of approximately 51½ degrees. The air at a temperature of 51½ degrees then contacts heat exchanger 15 to which water at a temperature of 34½ degrees is supplied by machine 18, and the air is cooled to a dewpoint of approximately 42 degrees. The final cooling is achieved by heat exchanger 16 supplied with brine at 26½ degrees by a machine 19 and the air finally discharged at a dewpoint of approximately 33 degrees. Under ordinary conditions, these three coolers, with their respective machines, have sufficient capacity to maintain the dewpoint temperature at or below 33 degrees. However, if the wet bulb temperature of the incoming air rises above 60 degrees, the capacity of the machines is not sufficient to maintain this low dewpoint. It is at this time that heat exchanger 13 is put into operation.

To supply the necessary cooling fluid, a storage tank 20 is utilized. This tank, as can best be seen from Fig. 2, is divided by a partition 21 and baffles 22a—22e, into a plurality of sections. The partition runs lengthwise of the tank from one end to a point a short distance from the other end, thus providing a trench 23 for a purpose hereinafter to be considered.

The baffles are mounted crosswise of the tank between the partition 21 and one side thereof, but they do not extend the full distance. Thus, as can be seen from Fig. 2, baffle 22a extends from the partition to within a short distance of the opposite side of the tank, baffle 22b from the side of the tank to within a short distance of the partition and so on, thus to provide a devious passageway. Mounted above the tank 20 is a flooring 24 which extends over the entire length of the tank and substantially the entire width. The flooring is tilted at a slight angle (see Fig. 3) so that the edge which is over the trench 23 is lower than the other edge.

A plurality of spray nozzles 25 are supplied with water withdrawn from the tank by pump 26. Pump 26 is not placed in operation until after the wet bulb temperature of the air drops below 60 degrees, as shown in Fig. 4, and is continued in operation until the water in the tank has been cooled by contact with the air to a temperature corresponding to the lowest wet bulb temperature which is attained during the twenty-four hours; which, for this particular curve, as is shown in Fig. 4, occurs at about six o'clock in the morning. Control of pump 26 may be manual or automatic, as desired. The water from the sprays 25 is collected on the flooring 24 and flows by gravity into the trench 23. The baffle arrangement is such that a circuitous circulation of water through the tank is secured, and immediate recirculation of water which has previously been cooled is thus avoided.

The machines 17, 18 and 19, as was previously explained, are designed to have a capacity to maintain a desired dewpoint when the wet bulb temperature is at or below a desired point, as, for example, 60 degrees.

As can be seen from Fig. 4, there are several hours during the day, to wit, from approximately 12.30 to 8.30 P. M. when the atmospheric wet bulb temperature is above 60. It is during this period that the pump 27 is placed in operation to circulate water through the cooler 13. The water, at a temperature of approximately 50 degrees, is easily capable of reducing the wet bulb temperature of the incoming air below 60 degrees, whereupon the machines 17, 18 and 19 are capable of reducing the air to its final desired low temperature—in this particular case 33 degrees.

In such an arrangement, if the air is to be discharged from the fan at a constant dewpoint throughout the entire day, the refrigerating machines may be operated at partial load during the low heat load period. In fact, if the stage operation indicated is employed, one or more of the machines may be cut off at least part of the time during the period between approximately midnight and 6 A. M., and under some conditions, no refrigeration need be employed.

In the larger majority of air conditioning installations, particularly those for human comfort, the apparatus dewpoint is carried at a point between 50 and 60 degrees. Thus, when comfort conditioning apparatus is desired in those parts of the world which have the unique wet bulb condition illustrated in Fig. 4, for example, in the vicinity of Johannesburg, Mexico City, the Great American Desert, and the Arizona Plateau, it is evident that no mechanical refrigeration need be provided at all. A storage tank such as 20, in combination with an atmospheric cooling system, may be utilized to maintain a dewpoint between 50 and 60 degrees, and to supply the entire refrigeration requirements. Since this type of equipment costs much less than mechanical refrigerating effect, it is obvious that a tremendous saving in first cost may be achieved. The operating economies which may be achieved are even more startling. Thus, for example, under suitable atmospheric conditions, when low wet bulbs prevail, the water from the storage tank may be circulated through cooler 13, if it is of the surface type, or sprayed, as in the ordinary washer. The air, as indicated by arrows 12, passing through the sprays, or in contact with the coils of exchanger 13, is thereby cooled. This method of operation may be combined in connection with the operation of the exchangers 14, 15 and 17. Thus, water from the tank may be fed into surface coolers of exchanger 13, and air passing in contact with the coolers will have its wet bulb temperature reduced. This air may then pass through sprays of exchanger 14, whereupon the air will be reduced to its lowered wet bulb temperature. If this temperature is below a desired maximum, no refrigeration will be required. If, however, some mechanical refrigeration is needed, then refrigerating machine 17 may be put into service. With this method of operation, only a minimum of mechanical refrigeration is employed, maximum refrigerating effect being achieved by the utilization of the evaporative cooling principle.

As indicated in Fig. 2, the heat exchanger 13 may itself be a sectionalized device including a plurality of groups of cooling surfaces, one or more of which may be utilized by actuating inlet and outlet valves 28 and 29 respectively by hand or automatically according to the dewpoint temperature required, preferably by means responsive to changes in temperature in the duct served by the fan 11. Instead of cooling surfaces, sprays or other suitable means may be employed.

In the arrangement of Fig. 3, only one third, approximately, of the heat of the sun's rays is absorbed by the water in the tank, while two thirds of the radiant solar heat is not absorbed. In the modification illustrated in Fig. 3a, a plate or shield 30 is disposed between the floor 24 and the water in the tank. In this arrangement, only one fifth, approximately, of the sun's radiant heat is absorbed.

The flooring 24 and/or the shield 30 may be supported on the baffles in the tank, the baffles being either inclined at the top to give the necessary support, or inclined only at the ends to give the necessary support to the flooring 24 and rabbeted to provide an intermediate support for a member, such as the shield 30.

In the construction shown in Fig. 2, it is preferable to put the pumps 26 and 27 below the water level in the tank to prevent loss of suction, and also the return pipe leading to the trench 23 is preferably below the water level to keep the lines and surface coolers full of water when the apparatus is shut down so as to avoid the necessity of venting the surface coolers daily.

If desired, the fan 11 instead of merely discharging into a room or into ducting as shown in Fig. 1 may discharge into a storage chamber of large capacity, indicated in Fig. 1 as a vertical duct, so that the refrigerating effect of the cold air can be stored in the duct.

A suitable form of duct may be a well or shaft formed in the ground. The shaft or well may then be used to store excess refrigerating capacity of the machines during low load periods, so that when the heat load is high during the daytime, that is to say, from about 12 noon to 8.30 in the evening and the dewpoint of air entering the shaft is consequently high, the stored refrigerating effect may be drawn upon.

From the foregoing, it will be observed that applicant provides a method of storing surplus refrigerating effect during low load periods and drawing on the refrigeration so stored during periods of high heat load.

In the event the wet bulb temperature of the air drops below 32 degrees, due to seasonal variation or the like, a brine solution may be used instead of water in the sprays and storage tank.

Though applicant has described his invention with reference to a particular type of spray pond and storage tank, it is to be understood that he does not limit himself thereto, and may, for example, use an underground reservoir for storage, if such practice be deemed expedient.

Further, although the heat exchangers 13, 14, 15 and 16 have been described as receiving refrigerant evaporatively or mechanically cooled, it is contemplated that refrigerant of any type or from any source may be used. Thus, the heat exchangers may comprise the expansion coils of a refrigerating system, or may be supplied with cold spring water or the like.

Since these and other changes in carrying out the above process and in the constructions set forth, which embody the invention, may be made without departing from its scope, it is intended that all matter contained in the above description or shown in the accompanying drawing shall be interpreted as illustrative and not in a limiting sense.

I claim:

1. A method of refrigeration which comprises evaporatively cooling a body of liquid during periods when the heat load is low and the wet bulb temperature of the atmosphere is below a predetermined point, storing the cooled liquid and protecting it from external sources of heat, and utilizing the cooled liquid for refrigeration purposes during periods when the heat load is high and when the wet bulb temperature of the atmosphere is above a predetermined point.

2. A method of refrigeration which consists in evaporatively cooling a body of liquid during periods when the heat load is low and the wet bulb temperature of the atmosphere is below a predetermined point, and using the liquid so cooled to augment the refrigerating effect produced by refrigerating machines during periods when the heat load is high and the wet bulb temperature of the atmosphere is above a predetermined point.

3. A method of refrigeration which consists in cooling a first body of liquid by converting it into spray and bringing said spray in intimate contact with air at a desirably low wet bulb temperature, storing the cooled liquid, artificially refrigerating a second body of liquid; and utilizing the first body of liquid to augment the refrigerating effect supplied by the second body of liquid.

4. A method of refrigeration which consists in cooling a body of liquid by intimate contact with air when the wet bulb temperature of the air is below a certain point, storing the liquid so cooled, and using it to augment the refrigerating effect produced by refrigerating machines during periods when the wet bulb temperature of the air is above said certain point and the heat load is excessive for the capacity of the machines.

5. A method of conditioning the atmosphere of a given area consisting in evaporatively cooling a liquid, utilizing said liquid to cool a volume of air, and discharging said air within the area, all during predetermined periods when the wet bulb temperature of the atmosphere is below a predetermined point, and, during other predetermined periods when the wet bulb temperature of the atmosphere is above a predetermined point, mechanically refrigerating a volume of liquid, utilizing said last mentioned liquid to cool another volume of air and discharging the second volume of air into the area whereby the cooling effect of the second volume of air in combination with the effect of the first volume of air produces desired air conditions within the area.

6. In air conditioning apparatus an air passage, an air inlet thereto, a first cooling means, a second cooling means, means for causing a flow of air through said passage in contact with said first cooling means and with said second cooling means, a water tank, means for intimately contacting water from the tank with air when its wet bulb temperature is below a desired point, means for storing water so cooled, a refrigerating machine, means for supplying refrigerating medium to said second cooling means, and means for supplying cooled water from said storing means to said first cooling means when the wet bulb temperature of the incoming air is above a desired point to augment the cooling effect of said second cooling means.

7. In an air conditioning apparatus, an air passage, a first cooling means, a second cooling means, means for causing air to flow through said passage in contact with said first cooling means and said second cooling means, a source of water, means for intimately contacting water from said source with air when its wet bulb temperature is below a desired point, means for storing water so cooled, a refrigerating machine, means in combination with said machine for supplying refrigerating medium to said second cooling means, and means for supplying cooled water from said storing means to said first cooling means when the wet bulb temperature of the incoming air is above a desired point to augment the cooling effect of said second cooling means.

8. The method of conditioning an enclosure which consists in evaporatively cooling a liquid, mechanically cooling a first volume of air and supplying said first volume of air to the enclosure, all during predetermined periods when the outdoor wet bulb temperature is relatively low, and, during other predetermined periods when the outdoor wet bulb temperature is relatively high, utilizing said cooled liquid to cool a second volume of air, mechanically cooling said second volume of air, and supplying said second volume of air to the enclosure, whereby the cooling effect of the second volume of air in combination with the effect of the first volume of air produces desired air conditions within the enclosure.

9. A method of cooling air, consisting in cooling a volume of water by contact with air when the wet bulb temperature of the air is below a desired point, storing the cooled water, bringing the water into heat exchange relation with a volume of air to reduce the wet bulb temperature of the air and passing the air through a spray.

10. The process of refrigeration which consists in intimately contacting water with atmospheric air, during periods when the wet bulb temperature of the air is below a predetermined point, whereby the water is cooled, and utilizing the cooled water for refrigeration purposes when the wet bulb temperature of the atmosphere rises above a predetermined point.

11. The process of refrigeration which consists in intimately contacting water with atmospheric air, during periods when the wet bulb temperature of the air is below a predetermined point, whereby the water is cooled, storing the cooled water, and utilizing the cooled water for air cooling purposes when the wet bulb temperature of the atmosphere rises above a predetermined point.

12. The method of conditioning an enclosure which consists in selectively routing water from a common source in a first course and in a second course at different predetermined times in accordance with variations in the wet bulb temperature of the atmosphere, evaporatively cooling water routed in said first course by contacting the water with atmospheric air, supplying air to said enclosure, passing water routed in said second course in heat exchange relation with air supplied to said enclosure, water being routed in said first course when the wet bulb temperature of the atmosphere is below a predetermined point, water being routed in said second course when the wet bulb temperature of the atmosphere is above a predetermined point and returning to said source water routed in both of said courses.

WALTER JONES.